United States Patent
Reed

(10) Patent No.: US 9,576,053 B2
(45) Date of Patent: Feb. 21, 2017

(54) METHOD AND SYSTEM FOR RANKING CONTENT OF OBJECTS FOR SEARCH RESULTS

(71) Applicant: Charles J. Reed, Jackson, NJ (US)

(72) Inventor: Charles J. Reed, Jackson, NJ (US)

(*) Notice: Subject to any disclaimer, the term of this patent is extended or adjusted under 35 U.S.C. 154(b) by 171 days.

(21) Appl. No.: 14/143,193

(22) Filed: Dec. 30, 2013

(65) Prior Publication Data
US 2014/0188902 A1 Jul. 3, 2014

Related U.S. Application Data

(60) Provisional application No. 61/747,432, filed on Dec. 31, 2012.

(51) Int. Cl.
*G06Q 30/02* (2012.01)
*G06F 17/30* (2006.01)

(52) U.S. Cl.
CPC ......... *G06F 17/30864* (2013.01); *G06Q 30/02* (2013.01)

(58) Field of Classification Search
CPC ................ G06Q 30/02; G06F 17/30864
See application file for complete search history.

(56) References Cited

U.S. PATENT DOCUMENTS

| | | | |
|---|---|---|---|
| 6,078,866 A | 6/2000 | Buck et al. | |
| 6,327,590 B1 | 12/2001 | Chidlovskii et al. | |
| 7,702,537 B2 | 4/2010 | Meisel et al. | |
| 7,836,391 B2 | 11/2010 | Tong | |
| 8,041,715 B2 | 10/2011 | Gnanamani et al. | |
| 8,082,246 B2 | 12/2011 | Meyerzon et al. | |
| 8,125,922 B2 | 2/2012 | Young et al. | |
| 8,250,066 B2 | 8/2012 | Miedema | |
| 8,296,292 B2 | 10/2012 | Shnitko et al. | |
| 8,370,337 B2 | 2/2013 | Kanungo et al. | |
| 8,577,893 B1 | 11/2013 | Patterson et al. | |

(Continued)

FOREIGN PATENT DOCUMENTS

| | | |
|---|---|---|
| EP | 1866806 A1 | 12/2007 |
| EP | 1909197 A1 | 4/2008 |

(Continued)

OTHER PUBLICATIONS

"The PageRank Citation Ranking: Bringing Order to the Web"; Jan. 29, 1998.

(Continued)

*Primary Examiner* — Rehana Perveen
*Assistant Examiner* — Raheem Hoffler
(74) *Attorney, Agent, or Firm* — Fox Rothschild LLP

(57) ABSTRACT

A method and system for ranking an object that contains one or more keywords is disclosed. All linking objects are retrieved that contain a keyword of interest. Each linking object links to the object to be ranked. The locations of each link in each linking object are determined relative to the keywords in the linking objects. A drop off rate is computed for the keyword in each of the linking objects. A perceived importance of the keyword in the each of the linking objects is computed. A partial link rating for each of the linking objects is computed. A total link rating is computed for the at least one keyword across all linking objects. The link ratings each keyword is stored in the object to be ranked.

15 Claims, 3 Drawing Sheets

(56) References Cited

U.S. PATENT DOCUMENTS

| | | | |
|---|---|---|---|
| 8,868,590 B1 * | 10/2014 | Donneau-Golencer | G06F 17/3053 707/733 |
| 9,104,754 B2 * | 8/2015 | Wedeniwski | G06F 17/30663 |
| 2006/0036598 A1 * | 2/2006 | Wu | G06F 17/30864 |
| 2006/0200556 A1 * | 9/2006 | Brave | G06F 17/30867 709/224 |
| 2010/0153370 A1 | 6/2010 | Gollapudi et al. | |
| 2011/0145234 A1 | 6/2011 | Hu | |
| 2012/0123857 A1 | 5/2012 | Surve et al. | |
| 2012/0185359 A1 | 7/2012 | Chen et al. | |
| 2012/0215796 A1 | 8/2012 | Zhang et al. | |
| 2012/0323908 A1 | 12/2012 | Herbert, Jr. et al. | |
| 2013/0110829 A1 | 5/2013 | Zhou | |
| 2013/0218899 A1 * | 8/2013 | Raghavan | G06F 17/30958 707/741 |

FOREIGN PATENT DOCUMENTS

| | | |
|---|---|---|
| EP | 2324438 A1 | 5/2011 |
| WO | WO-2008107244 A1 | 9/2008 |
| WO | WO-2008134532 A1 | 11/2008 |
| WO | WO-2009009428 A1 | 1/2009 |
| WO | WO-2009030972 A1 | 3/2009 |
| WO | WO-2010027914 A1 | 3/2010 |
| WO | WO-2012095768 A1 | 7/2012 |

OTHER PUBLICATIONS

Vol. I, No. 5, Nov.-Dec. 2012 (ISSN No. 2278-3091); International Journal of Advanced Trends in Computer Science and Engineering; Available Online at http://warsc.org/pdgs/ijatcse02152012.pdf; "Canvassing Ranking Algorithms"; Rupal Bhargava and Rekha Jain.

* cited by examiner

METHOD AND SYSTEM FOR RANKING CONTENT OF OBJECTS FOR SEARCH RESULTS

REFERENCE TO RELATED APPLICATIONS

This application is a non-provisional application claiming priority to U.S. Provisional Patent Application Ser. No. 61/747,432 filed Dec. 31, 2012, which is hereby incorporated by reference as if fully disclosed herein.

FIELD OF THE DISCLOSURE

The present disclosure relates to ranking objects for determining relevance to search keywords. More specifically, the present disclosure relates to methods and systems of ranking an object by analyzing objects that link to the object being ranked and determining the relationship between keywords and links to the object.

BACKGROUND

One key component of any content search system is the ability to rank one item of content against another item for the purpose of determining which item should be considered "better". This is required so that a user can be provided with a subset of the total set of results of which the objects within the subset are the best results possible. Many factors can be considered when ranking an item. Often used examples include how many other objects link to the object being ranked, or the number, or percentage, of clicks an object receives by users when returned in the results of a search.

SUMMARY

A method, system, and electronic device for determining a link rating for a keyword of an object associated with a keyword is disclosed. One or more linking objects that contain the keyword are received by the system and/or electronic device, wherein the one or more linking objects each contain at least one link to the object. The method also includes determining, by the electronic circuit, a drop off rate for each linking object, wherein the drop off rate relates the total number of links in the linking object to the total number of keywords in the linking object. For each linking object the method includes determining the location of the at least one link relative to the keyword and determining an importance of the keyword in the linking object relative to the object based on the location and the drop off rate. A partial link rating for the linking object is determined based on the importance and a rating of the linking object. A link rating for the keyword is determined by summing the partial link ratings for all linking objects. The link rating for the keyword associated with the object is stored in a non-transitory computer readable memory.

BRIEF DESCRIPTION OF THE DRAWINGS

Embodiments will be described with reference to the following drawing figures, in which like numerals represent like items throughout the figures, and in which.

DETAILED DESCRIPTION

Disclosed herein is a method and system to use the keywords displayed on objects which link to the object being ranked to develop a "link ranking" for each keyword for an object. An object is anything that is linked to by other objects. Examples include web pages, images, videos, and the like. A keyword is any significant word in a sentence or phrase that communicates content.

Each object (webpage, image, video, etc.) has a set of s ratings where s is equal to the number of unique keywords associated with (or displayed on) that object. Therefore, an object that may rank very highly for one search may rank much lower in another search solely because the object has high ratings for the keywords in the one search (when compared to other objects) but low ratings for the keywords in the other search.

Every object that contains a link to the object being ranked may be able to positively influence (it is impossible to negatively influence) the link rating for a keyword of the object. The only requirement to be able to influence the rating of a keyword of the object being ranked is that the linking object also contains that keyword. Therefore, all objects that link to this object, and the linking objects' keywords and keyword ratings must be retrieved from the database.

The distance from the location(s) of the link(s) on a given linking object to the location(s) of the keyword for which a rating is being calculated is an important component in the calculation. The further the keyword location(s) are from the location(s) of the link(s), the lower the perceived importance of the keyword to the link. The distance between a link and a keyword is measured by the number of keywords which appear between them. As an example, the following sentence is from the Wikipedia.org website for the State of New Jersey (http://en.wikipedia.org/wiki/New_jersey):

New Jersey is a state in the Northeastern and Middle Atlantic regions of the United States. It is bordered on the north and east by the U.S. state of New York, on the southeast and south by the Atlantic Ocean, on the west by Pennsylvania, and on the southwest by Delaware.

This paragraph is released under the Creative Commons Attribution-Share-Alike License 3.0 located at http://creativecommons.org/licenses/by-sa/3.0/.

The only link contained within the text is United States. The keyword "state" in the first sentence is a distance of 10 from the link (ignore for a moment the fact that this keyword also appears in the second sentence of the text at a distance of 12 from the link). It will therefore have a lower perceived importance for the link then the keyword "regions" (with a distance of just 3 from the link). Of course, knowing that a keyword has a lowered perceived importance, for a link, due to its distance from the link and being able to quantify just what its perceived value is are two different things.

Figure 1:
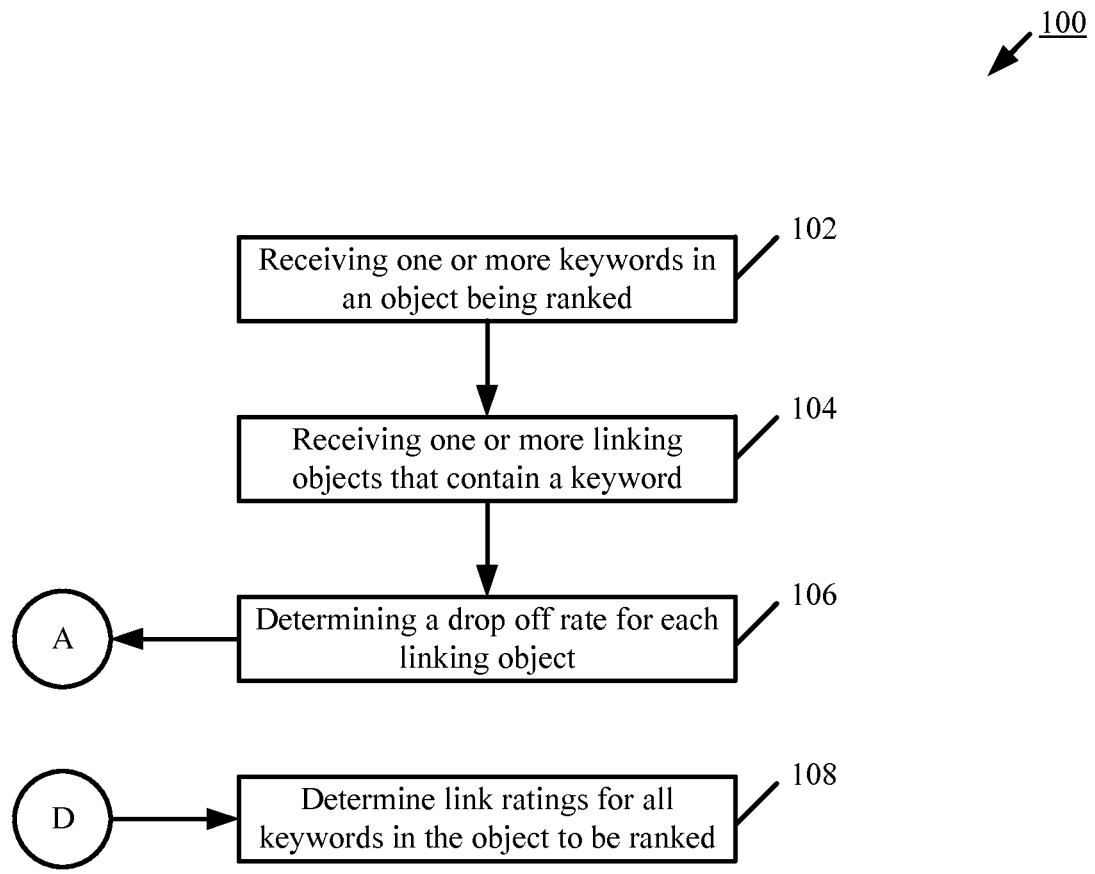
FIG. 1 is a flow chart of an example process for determining link ratings for all keywords in an object.

The key question is just how much does each unit of distance impart the importance of a keyword to a link. Referring now to FIG. 1, a process 100 is shown. All keywords in an object that is to be ranked (e.g. a web page) are received by an electronic device 102. The electronic device locates all linking objects that contain links to the object being ranked 104. These linking objects can be webpages, portable document format (PDF) files, images, videos, and/or any other object format that is capable of linking to another object. Once all the linking objects are located, a drop off rate is calculated for each linking object 106. In an example implementation, the drop off rate is calculated in accordance with the following formula, where count(keywords) is the number of keywords the linking object has (51 in this example) and count(links) is the number of links on the linking object (1 in this example):

$$DropOffRate = \left(\frac{1}{count(keywords)}\right) \times \sqrt[10]{count(links)} \quad \text{(Equation 1)}$$

Dividing 1 by the number of keywords results in the percentage of the total text of which each keyword comprises (1.96% in this example). The second factor is used because of the fact that the more links there are on a page, the less likely it is that a distant keyword applies strongly to a link. Therefore, this factor will increase (even though very slowly) the Drop Off Rate for objects that have more than one link. In this example, as it only has one link, and because $1^{(1/10)}$ is 1, the Drop Off Rate is 1.96%. This Drop Off Rate is the same for any keyword and for any link on the linking object.

Although it may appear so at this time, it is not as simple as multiplying the Drop Off Rate and the distance of the keyword from the link together to find the importance of the keyword for the link. There are two reasons for this. The first reason is that there could be more than one link on this object that links to the object being ranked; in which case, the distance of the locations of both links to the keyword must be considered. The second reason is that there is a 10% residual perceived importance minimum. That is, no keyword location can have a perceived importance less than 10% for a single link on the object. Consider the following revised version of the passage above:

New Jersey is a state in the Northeastern and Middle Atlantic regions of the United States. It is bordered on the north and east by the U.S. state of New York, on the southeast and south by the Atlantic Ocean, on the west by Pennsylvania, and on the southwest by Delaware.

As there are now two links in the object, the result of the Drop Off Rate calculation has changed. The new result is:

$$DropOffRate = 1.96\% \times \sqrt[10]{2} = 2.10\% \quad \text{(Equation 2)}$$

Figure 2:
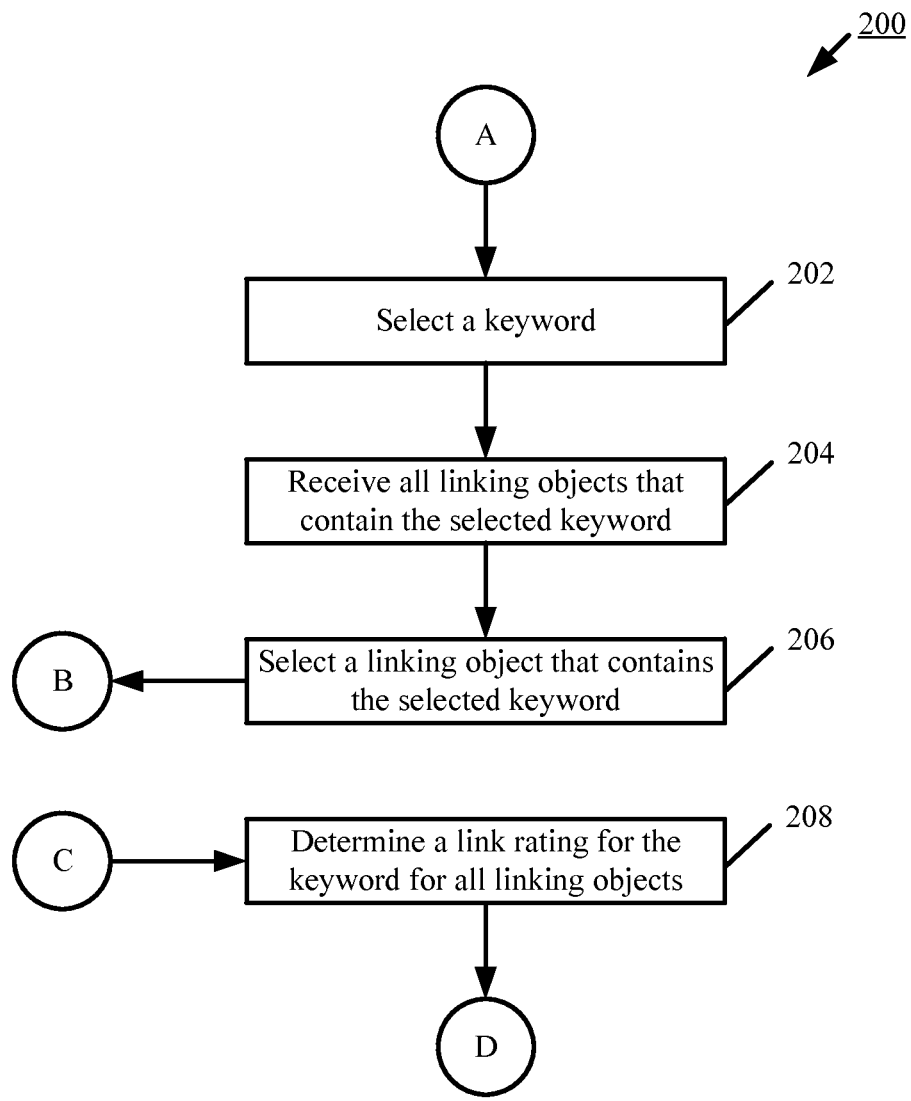
FIG. 2 is a flow chart of an example process for determining a link rating for a selected keyword in the object.

Once the drop off rate is calculated for each of the linking objects, the process continues as process 200 as shown in FIG. 2, which illustrates the process of determining a link rating for the linking object. A keyword from the object to be ranked is selected 202. For each selected keyword, all linking objects are located that contain at least the selected keyword 204. A linking object is selected from among those that contain at least the selected keyword 206.

Figure 3:
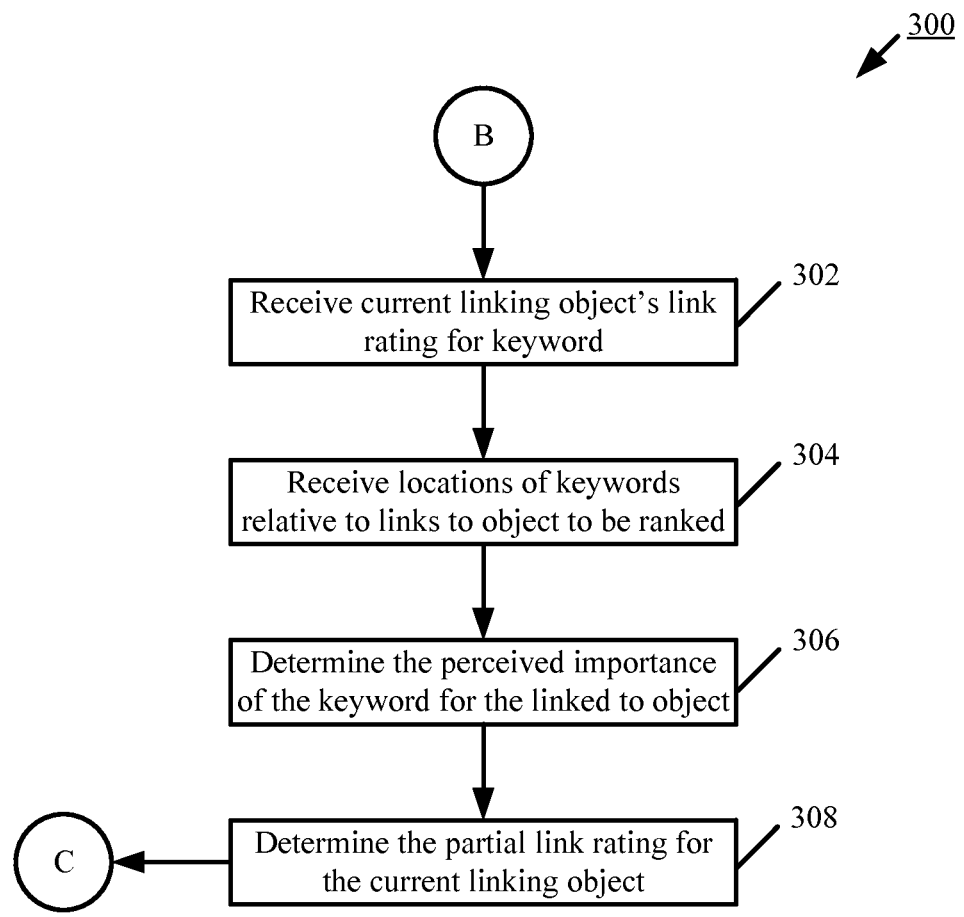
FIG. 3 is a flow chart of an example process for determining a partial link rating for the current linking object.

The selected linking object is then processed according to process 300, shown in FIG. 3. The selected linking object's link rating for the selected keyword 302. The linking object's link rating for the selected keyword may have been previously calculated using the process described in this document, or by any other process or set of criteria. For example, the link rating may be estimated based on statistical information such as the number of click-throughs on that link, how long a user views this object before returning to a set of results containing the object, and/or how highly users rate the object. The implementations described in this document are not limited in this regard.

Returning to the example given above, the links "United States" and "U.S." are processed. Although the text of these two links is different, the linked to object is the same in both links. As there now are two separate links to the object being ranked, a formula is now required that can combine the perceived importance of both links 306. This formula is shown below:

$$\frac{\sum_{n=1}^{c}(\text{Max}\{1 - (|location(link_n) - location(keyword)| \times DropOffRate), 0.1\})}{c} \quad \text{(Equation 3)}$$

where:
c=count(links to the object being ranked);
Max{ } returns the largest number of the numbers passed to it. This ensures that the lowest possible importance that a keyword can receive from a single link is 10%;
location( ) returns the distance (in words) from the start of the text to the link or keyword passed to it; and
DropOffRate=the drop off rate as calculated above in Equation 1.

This formula sums the larger value of subtracting the absolute value of the result of subtracting the location of each link from the location of the keyword multiplied by the Drop Off Rate from 1 or 0.1 together for each link location. The resulting sum is then divided by the number of links to the object being ranked contained on the linking object. The resulting quotient is the perceived importance of this keyword for the object being ranked.

In this example, the keyword is at location 5 and the links are at locations 15 and 27. Thus, the keyword for the first link location has a perceived importance of $1-(|15-5|*2.10\%)=0.79$ (or 79%). The keyword also has a perceived importance of $1-(|27-5|*2.10\%)=0.538$ (or 53.8%) for the second link. As one would expect, the keyword has a lower perceived importance for the link that is further away from it. The perceived importance for this keyword, for both links combined, then is: $(0.79+0.538)/2=0.664$ (or 66.4%).

Although the keyword has an importance of 79% for the first link to the object, since there is also a link to the object further away, it is therefore possible that this keyword is not that important for the object being linked to as it appears if only the first link is examined. Therefore, the average of the importance for the links is taken. As this example assumes that this is the only location on the object in which this keyword appears, the perceived importance is simply multiplied by the linking objects rating for this keyword to find the link rating for this keyword for the object being ranked.

The preceding example found the perceived importance of a keyword at a single location on the linking object; however, in many cases more than one instance of a word will appear on an object. In such a case, the perceived importance of all instances of the keyword should be included in the calculation. The resulting value is known as the Partial Link Rating 308. This formula is shown below:

$$\text{Partial } LinkRating = \frac{\sum_{n=1}^{c}(\text{rating} \times importance_n)}{\sqrt[2]{c}} \quad \text{(Equation 4)}$$

where:
c=the count/number of occurrences of the keyword on the linking object;

rating=the linking object's link rating for the keyword; and importance=the perceived importance for the keyword at index n, as calculated in Equation 3.

This formula adds the result of multiplying the linking object's link rating for the keyword by the perceived importance of the keyword's location compared to the location of the link together. However, rather than just dividing the sum by the number of occurrences of the keyword (which would result in the average), the sum is divided by the square root of the number of occurrences. This results in a larger value than a simple average; the increase grows as the number of occurrences of the keyword grows. This is used to help correctly weight the fact that a keyword is seen as more important the more often it occurs.

The value of the partial link rating for this keyword from this linking object has now been calculated. This process of calculating a partial link rating must be repeated for each linking object containing this keyword. The final step is to add all of the linking objects' partial link ratings for this keyword together to determine a link rating for the keyword for all the linking objects 208, as shown, for example, in the following formula.

$$\Sigma_{n=1}^{C} \text{PartialLinkRating}_n \qquad \text{(Equation 5)}$$

Variables:
C=count of linking objects.

Referring again to FIG. 1, this process is repeated for each keyword which appears on the object that is being ranked 108. Once it has been completed for every keyword, the calculation of the keyword link ratings for the object is complete.

The methods described in this document may, for example, be implemented on a mobile electronic device such as a mobile telephone or smartphone. However, one of ordinary skill in the art will recognize that the methods described herein may be implemented on any electronic device that contains electronic circuitry, such as one or more processors, computer readable memory and/or media, receiver and transmitter circuitry, one or more antennae, and the like. This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed:

1. A method for determining a link rating for a keyword in an object associated with the keyword, the method comprising:

receiving, by an electronic circuit, a keyword;

locating one or more web pages that contain the keyword, wherein the one or more web pages each contain at least one link to the object;

determining, by the electronic circuit, a drop off rate for each web page, wherein the drop off rate relates the total number of links in the web page to the total number of keywords in the web page;

for each web page:
   determining, by the electronic circuit, a keyword location of the keyword in the web page, wherein the keyword location is the distance in words between the keyword a starting location of text in the web page;
   determining, by the electronic circuit, a link location, in the web page, of each of the at least one links relative to the keyword location, wherein the link location is the relative distance in words between each of the at least one links and the keyword location;
   determining, by the electronic circuit, an importance of the keyword in the web page relative to the object based on the keyword location, the link location and the drop off rate; and
   determining, by the electronic circuit, a partial link rating for the web page based on, the number of occurrences of the keyword in the web page, the importance and a link rating of the web page for the keyword;

determining, by the electronic circuit, a link rating of the object for the keyword by summing the partial link ratings for all web pages that contain the keyword; and storing, in a non-transitory computer readable memory, the link rating of the object for the keyword associated with the object.

2. The method according to claim 1, wherein the object is associated with a plurality of keywords, the method further comprising:
   determining, by the electronic circuit, a link rating for all keywords in each web page; and
   storing, in the non-transitory computer readable memory, the link ratings of the object for all of keywords in each web page.

3. The method according to claim 2 wherein the drop off rate is computed by determining a count of keywords and a count of links in a web page and through the use of the formula $$\left( \frac{\sqrt[10]{\text{count of links}}}{\text{count of keywords}} \right).$$

4. The method according to claim 3, wherein the importance of each keyword is computed by according to the formula $\Sigma_{n=1}^{C}(\text{Max}\{1-(|\text{location}(\text{link}_n)-\text{location}(\text{keyword})|\times \text{DropOffRate}), 0.1\})$, wherein location($\text{link}_n$) is the link location and location (keyword) is the keyword location.

5. The method according to claim 4, wherein the importance of each link is computed by dividing the importance of each keyword by the total number of links in the web page that link to the object.

6. A system for determining a link rating for a keyword in an object associated with the keyword, the system comprising:

a processor; and
a non-transitory computer readable memory in communication with the processor and containing program instructions which, when executed, cause the processor to:
  in response to receiving a keyword, locate one or more web pages that contain the keyword, wherein the one or more web pages each contain at least one link to the object;
  determine a drop off rate for each web page, wherein the drop off rate relates the total number of links in each web page to the total number of keywords in the same web page;
  determine, for each web page, a keyword location in the web page, wherein the keyword location is the distance in words between the keyword a starting location of text in the web page;
  determine, for each web page, a link location in the web page of each of the at least one link relative to the keyword location, wherein the link location is the relative distance in words between each of the at least one links and the keyword location;
  determine, for each web page, an importance of the keyword in the web page relative to the object based on the keyword location, the link location and the drop off rate;
  determine, for each web page, a partial link rating for the web page based on, the number of occurrences of the keyword in the web page, the importance and a link rating of the web page;
  determine a link rating of the object for the keyword by summing the partial link ratings for all web pages that contain the keyword; and
  store, in the non-transitory computer readable memory, the link rating of the object for the keyword associated with the object.

7. The system according to claim 6, wherein the object is associated with a plurality of keywords, and wherein the program instructions, when executed, further cause the processor to:
  determine a link rating of the object for all keywords in each web page; and
  store, in the non-transitory computer readable memory, the link ratings of the object for the plurality of keywords associated with the object.

8. The system according to claim 7 wherein the drop off rate is computed by determining a count of keywords and a count of links in each web page and through the use of the formula $$\left( \frac{\sqrt[10]{\text{count of links}}}{\text{count of keywords}} \right).$$

9. The system according to claim 8, wherein the importance of each keyword is computed by according to the formula $\Sigma_{n=1}^{C}(\text{Max}\{1-(|\text{location}(\text{link}_n)-\text{location}(\text{keyword})|\times\text{DropOfRate}),0.1\})$, wherein location($\text{link}_n$) is the link location and location (keyword) is the keyword location.

10. The system according to claim 9, wherein the importance of each link is computed by dividing the importance of each keyword by the total number of links in the web page that link to the object.

11. An electronic device for determining a link rating for a keyword in an object associated with the keyword, the device comprising:
a processor; and
a non-transitory computer readable memory containing program instructions which, when executed, cause the processor to:
  in response to receiving a keyword, locate one or more web pages that contain the keyword, wherein the one or more web pages each contain at least one link to the object;
  determine a drop off rate for each web page, wherein the drop off rate relates the total number of links in the web page to the total number of keywords in the web page;
  determining, by the electronic circuit, a keyword location of the keyword in the web page, wherein the keyword location is the distance in words between the keyword a starting location of text in the web page;
  determine, for each web page, a link location of each of the at least one links relative to the keyword location, wherein the link location is the relative distance in words between each of the at least one links and the keyword location;
  determine, for each web page, an importance of the keyword in the web page relative to the object based on the keyword location, the link location and the drop off rate;
  determine, for each web page, a partial link rating for the web page based on, the number of occurrences of the keyword in the web page, the importance and a link rating of the web page t;
  determine a link rating of the object for the keyword by summing the partial link ratings for all web pages that contain the keyword; and
  store, in the non-transitory computer readable memory, the link rating of the object for the keyword associated with the object.

12. The device according to claim 11, wherein the object is associated with a plurality of keywords, and wherein the program instructions, when executed, further cause the processor to:
  determine a link rating for all keywords in each web page; and
  store, in the non-transitory computer readable memory, the link ratings of the object for the plurality of keywords associated with the object.

13. The device according to claim 12 wherein the drop off rate is computed by determining a count of keywords and a count of links in a each web page and through the use of the formula $$\left( \frac{\sqrt[10]{\text{count of links}}}{\text{count of keywords}} \right).$$

14. The device according to claim 13, wherein the importance of each keyword is computed by according to the formula $\Sigma_{n=1}^{C}(\text{Max}\{1-(|\text{location}(\text{link}_n)-\text{location}(\text{keyword})|\times\text{DropOfRate}),0.1\})$, wherein location($\text{link}_n$) is the link location and location (keyword) is the keyword location.

15. The system according to claim 14, wherein the importance of each link is computed by dividing the importance of each keyword by the total number of links in the web page that link to the object.

* * * * *